United States Patent [19]
Plöckinger et al.

[11] 3,719,790
[45] March 6, 1973

[54] COMPOSITION AND METHOD FOR FORMING A WELD-SURFACED ALLOYED STEEL LAYER OF STEEL

[75] Inventors: Erwin Plöckinger; Hermann Ornig; Alfred Schmidt, all of Kapfenberg, Austria

[73] Assignee: Gebruder Bohler & Co. Aktiengesellschaft, Kapfenberg, Austria

[22] Filed: June 21, 1968

[21] Appl. No.: 744,603

Related U.S. Application Data

[63] Continuation-in-part of Ser. No. 580,157, Sept. 15, 1966, which is a continuation-in-part of Ser. No. 490,789, Sept. 28, 1965, abandoned.

[30] Foreign Application Priority Data

Sept. 17, 1965 Austria..............................A 8490/65
Sept. 17, 1965 Austria..............................A 8491/65

[52] U.S. Cl..................219/73, 75/128 B, 29/196.1, 75/125
[51] Int. Cl. ..............................................B23k 9/16
[58] Field of Search............75/128 A, 128 G, 128 B; 219/76, 146, 171, 73

[56] References Cited

UNITED STATES PATENTS

| | | | |
|---|---|---|---|
| 2,147,122 | 2/1939 | Emmons | 75/126 |
| 2,575,219 | 11/1951 | Giles | 75/126 |
| 2,863,981 | 12/1958 | Thomas | 75/126 |
| 3,078,363 | 2/1963 | Johnson | 260/525 |
| 3,102,025 | 8/1963 | Wilcox | 75/128 |
| 3,139,508 | 6/1964 | Freeman | 219/74 |
| 3,195,230 | 7/1965 | Peck | 29/496 |
| 3,177,339 | 4/1965 | Sheruhn | 119/51.11 |
| 3,223,818 | 12/1965 | Chyle | 219/73 |
| 3,493,713 | 2/1970 | Johnson | 219/76 |
| 2,206,375 | 7/1940 | Swift | 29/491 |
| 2,948,805 | 8/1960 | Berg | 219/146 |
| 3,035,934 | 5/1962 | Cape | 75/171 |
| 3,118,760 | 1/1964 | Avery | 75/128 A |
| 3,271,553 | 9/1966 | Johnson | 219/76 |

Primary Examiner—Hyland Bizot
Attorney—Arthur O. Klein

[57] ABSTRACT

This invention relates to articles having a wearing surface affixed thereto by means of welding. The invention is particularly applicable to workpieces and tools, such as machine knives.

In particular, the invention discloses novel compositions and methods for cladding or surfacing a metal article by means of a so-called band or flat strip electrode thereby producing a very hard wearing layer of allowed steel on said article. The use of flat strip electrodes results in a flat and uniform penetration and, consequently, in a slight and uniform mixing with the base material of the article.

4 Claims, 2 Drawing Figures

Inventors:
Erwin PLÖCKINGER,
Alfred SCHMIDT and
Hermann ORNIG

By Arthur O. Klein
their Attorney

COMPOSITION AND METHOD FOR FORMING A WELD-SURFACED ALLOYED STEEL LAYER OF STEEL

CROSS REFERENCE TO RELATED APPLICATION

This is a continuation-in-part application of our copending application Ser. No. 580,157, filed on Sept. 15, 1966.

The application Ser. No. 580,157 is a continuation-in-part of our application Ser. No. 490,789, filed on Sept. 28, 1965, now abandoned.

BACKGROUND OF THE INVENTION

It is known to regenerate worn and spent portions of tools by weld-surfacing. For example, worn teeth of excavators are regenerated by weld-surfacing, using welding rods of hard manganese steels. Great difficulties have been encountered in producing weld-surfaced wearing layers with ordinary round welding rods, having high speed steel compositions. (Welding with such electrodes causes a deep penetration of the base material. Therefore the welding composition of the first layer consists of about 50 percent of the base material which is generally composed of mild steel.) This penetration results in reducing the percentage of important alloying elements in the wearing layer. In order to compensate for this reduction, the wearing surface is generally produced by two or more layers. Because such a procedure generally produces hot cracking, the base layer has to be reheated up to 300°C. Preheating causes low hardness and therefore a hardening process afterwards has to be applied. The hardening process results in a distortion of the workpiece and a big grain size in the base metal.

It is furthermore known to use flat strip electrodes of copper, mild steel and stainless steel for surface welding. The use of high-speed steel flat strip electrodes used for surface welding does not, however, form part of the prior art. It has been surprisingly found that, when using a flat strip or band electrode of high speed steel under predetermined conditions, some of which are defined by certain ranges set forth in the claims, weld-surfaced wearing layers can be produced on base layers, which result in composite articles of superior mechanical and physical properties. For example, such a composite article has a different, more uniform and, consequently, much better microstructure. Consequently, workpieces and tools of distinctly superior quality can be produced with the methods for producing composite articles and the composite articles disclosed herein.

The use of conventional filler rods or welding wires resulted in a surface which was not smooth and required subsequent machining in many cases. The machining of surfaces consisting of high-speed alloyed steels is, however, very difficult and expensive.

Another disadvantage lies in the frequent formation of contraction cracks in the weld-surfaced layers produced with conventional filler rods or welding wires. This phenomenon can be explained as follows: Due to their relatively deep penetration, the cross-section of the weld bead is approximately circular. During solidification the preferred directions of the crystal axes are approximately at right angles to the welded surface. The impurities in the weld are one of the main causes for a formation of contraction cracks and are favored in that portion of the weld which solidifies last, i.e., the interior of the bead. Thus, contraction cracks frequently form in the interior of the beads. In using a flat strip electrode the bead is flat and solidification proceeds from base metal to the surface of the bead. Thus, the impurities are enriched at the surface of the bead and, consequently, the possibility for causing contraction cracks is diminished.

SUMMARY OF THE INVENTION

It is accordingly a primary object of the present invention to provide a method of producing a wearing surface consisting of wear resisting alloyed steel such as high speed steel, high chromium steel, high manganese steel of other wear resisting alloys e.g., of the cobalt type on a base layer of tough steel particularly for workpieces or tools by means of a flat strip electrode consisting of said high speed alloyed steel.

It is another primary object of this invention to provide a composite article particularly adapted for use in workpieces and tools which has a base of tough steel and a weld-surfaced wearing layer consisting of wear resisting alloyed steel such as high speed steel, high chromium steel, high manganese steel or other wear resisting alloys e.g., of the cobalt type welded thereon by means of a flat strip electrode.

It is another more specific object of the present invention to provide a method for producing a wearing surface consisting of high speed alloyed steel by means of a flat strip electrode consisting of the same material on a base of tough steel, wherein said flat strip electrode uniformly penetrates the base and, consequently, is mixed only slightly with the base material.

In the preferred weld surfacing practice of the present invention, a bare electrode, of the aforedescribed compositions, in the form of a relatively thin strip of metal is fed to the welding zone. A welding current is caused to flow through a circuit which includes the work end of the strip. When using a flat strip electrode, the arc travels back and forth across the strip, maintaining its juncture with the work at the point of least resistance. Accordingly, the heat produced by the arc encompasses a greater width in its path of travel across the work and, consequently, the penetration and resultant dilution are kept at a minimum.

While preferably the submerged arc welding technique is to be used with the subject invention, it is not limited to this technique as other welding techniques could be adapted to the method of the present invention.

BRIEF DESCRIPTION OF THE DRAWING

The invention is illustrated by way of example in the accompanying drawing which forms part of the application and in which a machine knife embodying the invention is shown in FIG. 1 in a perspective view, and in FIG. 2 in a fragmentary sectional view taken through the weld-surfaced layer.

DESCRIPTION OF THE PREFERRED EMBODIMENTS

Figure 1:
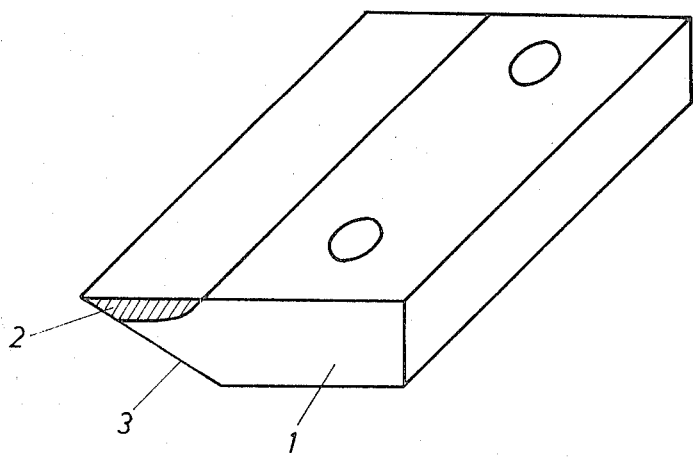

With reference to the drawing, the machine knife comprises a base 1, which is provided with a weld-surfaced layer 2 forming a working surface or cutting edge portion of the knife. The base 1 has exposed non-working surface portions 3.

Figure 2:
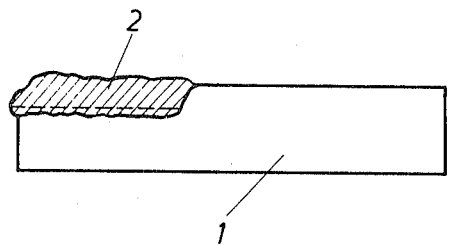

FIG. 2 shows the uniform, relatively small penetration of the weld-surfaced layer 2 into the base 1.

Welds of good surface appearance were deposited by using a flat strip electrode over a fairly wide range of welding conditions which will be set forth below. Cross sectional examination indicated that with the proper combination of conditions a relatively low order of dilution and uniform penetration of the weld-surfaced layer resulted without requiring preheating of the base. When welding conditions outside the ranges set forth below were used the resulting weld-surfaced layer proved unsatisfactory. A microstructural examination was used to determine the quality of the weld-surfaced layer. Only when welding conditions within the ranges set forth below were used was the required chemistry found, together with satisfactory hardness and a microstructure providing the basis for good cutting properties. The amount of base metal dilution did not exceed 15% of the cutting edge material that had been built up on this knife, no further layers of weld metal being necessary. Another significant fact is that the orientation of most of the individual grains making up the solidified structure are substantially oriented in a direction perpendicular to that of the stresses when the workpiece is in operation. It is obvious that the angular orientation of the crystals in a weld-surfaced layer influences the adhesiveness of the layer and, consequently, the likelihood of cracking under stress.

The ranges of welding conditions which proved satisfactory while using a submerged arc welding technique are as follows:

1. Dimensions of the flat strip or band electrode

It has been found that flat strip electrodes having a width ranging from 5 mm to 120 mm and a thickness ranging from 0.3 mm to 3.2 mm proved satisfactory, whereas the use of a flat strip electrode having one or more dimensions falling outside these ranges proved to be unsatisfactory.

2. Current used in welding with a flat strip electrode

It has been found that the most advantageous results would be obtained when using a welding current density ranging from 10 to 50 amperes per $mm^2$. Higher current densities resulted in too great penetration, lower currents in a poor appearance of the welding bead.

3. Voltage used in welding with a flat strip electrode

It has been found that the most advantageous results would be obtained when using a welding voltage ranging from 22 volts to 40 volts. Lower voltages caused an increase in penetration, higher voltages caused too violent arcing.

4. Rate of cooling when welding with a flat strip electrode

One of the more important advantages features of the present invention lies in the fact that the base requires no preheating. In some cases it has proven advantageous to place the base on a copper plate in order to speed up the cooling process. In some cases the composite article is heat treated after the welding and the removal of the slag has been completed. However, it should be noted that this additional step serves only to obtain a further hardening of the weld-surfaced layer due to the well known precipitation and segregation effect and really does not pertain to the gist of the present invention.

5. Speed of welding with a flat strip electrode

It has been found that the most advantageous results would be obtained when using a travel speed of 7 cm to 30 cm per minute.

6. Composition of the flat strip welding electrode

The chemical composition of the band electrode depends on the purposes for which the tools according to the invention are used. There follows hereafter a tabulation.

CHEMICAL COMPOSITION OF BAND ELECTRODES

| Type of alloy | Percent | | | | | | | | | | | |
|---|---|---|---|---|---|---|---|---|---|---|---|---|
| | C | Si | Mn | Cr | Mo | Ni | V | W | Co | Nb | Fe | Cu |
| 1. High speed steels | 0.2-1.7 | 0.1-1.7 | 0.1-2.0 | 1.0-7.0 | 0.1-12.0 | 0.1-5.0 | 0.1-6.0 | 0.5-21.0 | 0.1-10 | 0.2-0.3 | Rest | 0.0-0.4 |
| 2. High chromium steels | 0.1-1.1 | 0.2-4.0 | 0.3-0.8 | 12.0-21.0 | 0.0-3.0 | 0.1-2.0 | 0.0-0.3 | | | | Rest | |
| 3. High manganese steels | 1.0-1.5 | 0.3-0.6 | 6.0-18.0 | 0.1-2.0 | 0.1-2.0 | 0.1-6.0 | | | | | Rest | |
| 4. Stellites | 0.0-1.2 | 0.5-1.0 | 0.1-1.0 | 25.0-37.0 | | 0.1-7.0 | | 2.0-25.0 | Rest | | 0.0-5 | |

It can be noted that the carbon content of the band electrode varies from zero percent (Stellite without carbon content) to 1.7 percent. However, the carbon content in the formed wearing layer itself, due to the usage of carburizing welding flux materials, may increase up to 4 percent.

7. Flux used with the submerged arc-welding technique when using a flat strip electrode While any number of well known commercial welding flux granular materials may be used, the following are given by way of example only:

| Flux | $SiO_2$ | $Al_2O_3$ | FeO | MgO | CaO | MnO | $CaF_2$ |
|---|---|---|---|---|---|---|---|
| Linde UM 8 | 36 | 13 | 1.5 | 9 | 28 | 8 | 3 |
| Linde UM 50 | 41 | 4 | 1.5 | — | 10 | 39 | 4 |
| Linde UM 20 | 50 | 4 | 0.5 | 10 | 29 | — | 6 |
| Lincoln Flux 840 | 36 | 14 | 3.0 | 27 | — | 13 | 6 |

In some cases it is necessary to mix these fluxes with up to 10 percent carbon to get a higher carbon content in the weld metal.

BASE MATERIAL USED WITH THE FLAT STRIP ELECTRODE

The flat strip electrode of the present invention may be used with a large number of different types of metallic base materials. A base of tough steel is frequently used because it frequently constitutes the base material in workpieces, the working surfaces of which are to be regenerated by weld-surfacing. Consequently, the following compositions of base materials are given by way of examples only and the invention is not to be limited in this respect.

a. a low alloyed or non alloyed steel having 0.05 to 0.65% C; 0.05 to 0.5 Si; 0.4 to 2.0% Mn; 0.0 to 2.5% Cr; 0.0 to 1.0% Mo; 0.0 to 2.0% Ni; 0.0 to 0.3% V.

b. a stainless steel of the type 18 Cr 8 Ni with max. 0.1 C; max. 2.5% Si; max. 2.5 Mn; 16 to 28% Cr; 7 to 22% Ni; 0.0 to 5.0% Mo; 0.0 to 4.0% Cu; 0.0 to 1.5% Nb; 0.0 to 1% Ti; 0.0 to 2.0% Al.

The invention will be explained more fully by the following examples, it being understood, however, that these examples are given by way of illustration and not by way of limitation and that many changes may be effected without affecting the scope and spirit of the invention as defined in the appended claims.

Example 1

To make a machine knife a base member of non-alloyed steel was used as a base material which had the following composition:

| C | Si | Mn | S | P |
|---|---|---|---|---|
| 0.15% | 0.20% | 0.40% | 0.035% | 0.035% | the remainder Fe with the usual impurities.

The base member had the following dimensions 60 mm × 10 mm × 3000 mm. Along a longitudinal edge of the base member a groove having a cross-section of 20 mm × 4 mm was formed. The base member was tightly clamped to a copper base plate. A flat strip electrode having a cross-section of 18 mm × 1.8 mm was used to surface-weld a wearing layer 2 in the base member 1. The flat strip electrode had the following composition:

| C | Si | Mn | Cr | W | Mo | V |
|---|---|---|---|---|---|---|
| %0.85 | 0.3 | 0.35 | 4.3 | 6.1 | 5.1 | 2.0 | the rest iron with the usual impurities.

A well known commercial flux granular material UM 50 was used without preheating the base member and in this way the groove was filled with welded material from the flat strip electrode.

An analysis of the finished composite article indicated the following composition for the weld-surfaced layer:

| C | Si | Mn | Cr | W | Mo | V |
|---|---|---|---|---|---|---|
| % 0.5 | 0.65 | 0.97 | 2.94 | 4.78 | 3.82 | 1.21 | the rest iron with the usual impurities.

The welding conditions were as follows:

Current 950 A (=29A/m²), voltage 28 V; travel speed 13 cm/min. After the slag was removed the blank was tempered at 540°C. and thereby the knife was hardened to 61 RC. The blank was then finished and sharpened by grinding.

Example 2

Manufacturing another type of machine knife

The base member was dimensioned 79 × 19 × 3000 mm and had a longitudinal groove along one edge having a cross-section of 4 × 25 mm and the following composition:

| C | Si | Mn |
|---|---|---|
| % 0.36 | 0.22 | 0.3 | the rest iron with the usual impurities.

The submerged arc welding technique was used with a UM–50 granular flux material. The base member was clamped to a copper base plate. The band or flat strip electrode used had a cross-section of 23 × 1.6 mm which had the following composition:

| C | Si | Mn | Cr | W | Mo | V |
|---|---|---|---|---|---|---|
| % 0.84 | 0.31 | 0.35 | 4.20 | 6.39 | 5.03 | 2.02 | the remainder iron with the usual impurities.

The resultant weld-surfaced wearing layer had the following composition:

| C | Si | Mn | Cr | W | Mo | V |
|---|---|---|---|---|---|---|
| % 0.48 | 0.67 | 0.93 | 2.88 | 4.99 | 3.91 | 1.26 | the remainder iron with the usual impurities.

The welding conditions were as follows: Current 650 amperes; voltage 25 volts, travel speed 20 cm/minute.

Example 3

Work on a chopping knife for chopping wood.

The base member was dimensioned 170 × 16 × 450 mm and had a groove along one of its edges having a cross-section of 35 × 4 mm. The submerged arc welding technique was used with a UM–80 granular flux material without preheating the base material. The base member was clamped to a copper base plate.

The welding conditions were as follows: Current 1250 amperes (25 amperes/mm²); voltage 25 volts; travel speed 15 cm per minute. The cross-section of the flat strip electrode measured 28 × 1.8mm.

An analysis indicated the following:

| | C | Si | Mn | Cr | W | V |
|---|---|---|---|---|---|---|
| base member | %0.45 | 0.2 | 0.6 | - | - | - |
| flat strip electrode weld-surfaced | %0.75 | 0.2 | 0.3 | 4.3 | 18 | 1.1 |
| wearing layer | %0.51 | 0.6 | 0.7 | 3.5 | 15.2 | 0.6 | the remainder Fe with the usual impurities

Example 4

Producing a chopping knife or axe for the wood industry

The base member was dimensioned 200 × 20 × 600 mm and had a groove along one of its edges having a cross-section of 35 × 4 mm. The submerged arc welding technique was used with a UM-50 granular flux material without preheating the base material. The base member was clamped to a copper base plate.

The welding conditions were as follows: Current 1150 amperes (25 amperes/mm$^2$); voltage 35 volts; travel speed 15 cm per minute. The cross-section of the flat strip electrode measured 33 × 2.3 mm.

An analysis indicated the following:

|  | C | Si | Mn | Cr | W | Mo | Ni | Co | V |
|---|---|---|---|---|---|---|---|---|---|
| base member | %0.40 | 0.3 | 0.6 | 0.75 | - | 0.4 | 1.4 | - | - |
| flat strip electrode | %1.50 | 0.2 | 0.3 | 5.0 | 12.5 | - | - | 5.0 | 5.0 |
| weld-surfaced wearing layer | %0.92 | 0.6 | 0.9 | 3.5 | 9.5 | - | - | 4.7 | 3.1 | the remainder iron with the usual impurities.

Example 5

A circular cutting knife

The base member was a disc having a diameter of 550 mm. and a thickness of 50 mm. It has grooves on both sides of its edges with a cross-section of 18 × 5 mm. each. The grooves were filled up by means of the submerged arc welding technique with a flat strip electrode having a size of 20 × 1.5 mm. using a UM-50 granular flux material without preheating.

The welding conditions were as follows: Current 720 amperes (24 amperes per mm$^2$); voltage 30 volts; travel speed 30 cm per minute.

An analysis indicated the following:

|  | C | Si | Mn | Cr | W | Mo | V |
|---|---|---|---|---|---|---|---|
| base member | %0.25 | 0.25 | 0.4 | 1.0 | - | 0.3 | - |
| flat strip electrode | %0.85 | 0.30 | 0.35 | 4.3 | 6.1 | 5.1 | 2.0 |
| weld-surfaced wearing layer | %0.52 | 0.60 | 0.9 | 3.0 | 5.0 | 4.2 | 1.3 | the remainder iron with the usual impurities.

Example 6

Another type of circular cutting knife

The base member consisted of a round disc having a diameter of 400 mm and a thickness of 20 mm. The circumferential face of the disc is weld surfaced with a UM-50 granular flux material without being preheated forming a layer of 20 × 4 mm.

The welding conditions were as follows: Current 720 amperes (24 amperes per mm$^2$); voltage 30 volts; travel speed 30 cm per minute. The cross-section of the flat strip electrode measured 20 × 1.5 mm.

An analysis indicated the following:

|  | C | Si | Mn | Cr | W | Mo | Ni | Co | V |
|---|---|---|---|---|---|---|---|---|---|
| base member | %0.30 | 0.3 | 0.5 | 2.0 | - | 0.3 | 2.0 | - | - |
| flat strip electrode | %1.05 | 0.2 | 0.3 | 3.7 | 1.5 | 9.5 | - | 8.0 | 1.5 |
| weld-surfaced wearing layer | %0.73 | 0.6 | 0.7 | 3.2 | 0.8 | 8.5 | 0.1 | 7.2 | 1.1 | the remainder Fe with the usual impurities.

Example 7

A machine knife for the paper industry

The base member was dimensioned 210 × 18 × 1500 mm and had a groove along one of its longitudinal edges having a cross-section of 38 × 5 mm. The submerged are welding technique was used with a UM—50 granular flux material without preheating the base member.

The welding conditions were as follows: Current 1350 amperes (=14 amperes/mm$^2$); voltage 36 volts; travel speed 22 cm/min. The cross-section of the flat strip electrode measured 38 × 2.5 mm.

An analysis indicated the following:

|  | C | Si | Mn | Cr | W | Mo | V |
|---|---|---|---|---|---|---|---|
| base member | %0.60 | 0.3 | 0.6 | - | - | - | - |
| flat strip electrode | %1.70 | 0.3 | 0.3 | 12.0 | 0.5 | 0.6 | 0.1 |
| weld-surfaced wearing layer | %1.20 | 0.8 | 0.3 | 8.2 | 0.3 | 0.4 | 0.05 | the remainder Fe with the usual impurities.

Example 8

A circular cutting knife

The base member consisted of a round disc having a diameter of 300 mm and a thickness of 15 mm with an annular groove along its outer peripheral edge having a cross-section measuring 15 × 3 mm. The submerged are welding technique was used with a UM-50 granular flux material without preheating the base member.

The welding conditions were as follows: Current 600 amperes (40 amperes per mm$^2$); voltage 26 volts; peripheral travel speed 30 cm per minute. The cross-section of the flat strip electrode measured 15 × 1.0 mm.

An analysis indicated the following:

|  | C | Si | Mn | Cr | W | Mo | V |
|---|---|---|---|---|---|---|---|
| base member | %0.48 | 0.3 | 1.8 | - | - | - | - |
| flat strip electrode | %0.55 | 0.85 | 0.3 | 8.5 | 1.1 | 1.2 | 0.13 |
| weld-surfaced wearing layer | %0.51 | 1.1 | 0.5 | 7.0 | 0.9 | 1.0 | 0.1 | the remainder Fe with the usual impurities.

Example 9

Wood fiber planing knife

The base member was dimensioned 8 × 110 × 200 mm and had a groove along one of its edges having a cross-section of 20 × 3 mm. The submerged arc welding technique was used with a UM-20 granular flux material without preheating the base member.

The welding conditions were as follows: Current 700 amperes; voltage 27 volts; travel speed 26 cm per minute. The cross-section of the flat strip electrode measured 20 × 1.5 mm.

An analysis indicated the following:

|  | C | Si | Mn | Cr | W |
|---|---|---|---|---|---|
| base member | %0.25 | 0.2 | 0.4 | - | - |
| flat strip electrode | %0.76 | 0.5 | 0.5 | 2.5 | 3.3 |
| weld-surfaced wearing layer | %0.53 | 0.9 | 0.3 | 1.7 | 2.5 | the remainder Fe with the usual impurities

Example 10

Another type of wood fiber planing knife

The base member was dimensioned 15 × 100 × 6000 mmm and had a groove along one of its edges having a cross-section of 15 × 5 mm. The submerged are welding technique was used with a Lincoln Flux 840 granular material without preheating the base member.

The welding conditions were as follows: Current 530 amperes; voltage 25 volts; travel speed 23 cm per minute. The cross-section of the flat strip electrode measured 15 × 1 mm.

An analysis indicated the following:

|  | C | Si | Mn | CrMo |  | Ni | Cu |
|---|---|---|---|---|---|---|---|
| base member | %0.35 | 0.25 | 0.45 | - | - | - | - |
| flat strip electrode | %0.60 | 0.20 | 0.20 | 1.7 | 0.2 | 4.5 | 0.4 |
| weld-surfaced wearing layer | %0.42 | 0.50 | 0.50 | 1.3 | 0.2 | 4.0 | 0.3 | the remainder Fe with the usual impurities.

Example 11

Dredger bucket

The base member was dimensioned 15 × 100 × 6000 mm. Strips consisting of hard manganese steel and having 40 mm width and 20 thickness were welded on both sides (exterior and interior). The submerged arc welding technique was used with a UM–50 granular flux material without preheating the base member.

The welding conditions were as follows: Current 600 amperes; voltage 31 volts; travel speed 15 cm per minute. The cross-section of the flat strip electrode measured 40 × 1.0 mm.

An analysis indicated the following:

|  | C | Si | Mn |
|---|---|---|---|
| base member | %0.26 | 0.5 | 0.8 |
| flat strip electrode | %1.2 | 0.2 | 13.5 |
| weld-surfaced wearing layer | %0.8 | 0.6 | 9.2 | the rest iron with the usual impurities.

Example 12

Pressure bar, for wood-peeling machine

The base member was dimensioned 60 × 15 × 3500 mm and had a groove along one of its edges having a cross-section of 15 × 5 mm. The submerged arc welding technique was used with a UM–80 granular flux material without preheating the base member.

The welding conditions were as follows: Current 500 amperes; voltage 27 volts; travel speed 18 cm per minute. The cross-section of the flat strip electrode measured 14 × 1.0 mm.

An analysis indicated the following:

|  | C | Si | Mn | Cr | W | Mo | Co | Fe |
|---|---|---|---|---|---|---|---|---|
| base member | %0.15 | 0.25 | 0.6 | - | - | 0.3 | - | rest |
| flat strip electrode | %0.40 | 0.3 | 0.3 | 29.5 | 5.7 | - | rest | 3 |
| weld-surfaced wearing layer | %0.35 | 0.5 | 0.7 | 25.1 | 4.5 | - | rest | 14 |

Example 13

Cotton shearing knife

The base member was dimensioned 40 × 6 × 200 mm and had a longitudinal groove along one of its edges having a cross-section of 12 × 3 mm.

The submerged arc welding technique was used with a UM–50 granular flux material without preheating the base member.

The welding conditions were as follows: Current 350 amperes; voltage 22 volts; travel speed 23 cm per minute. The cross-section of the flat strip electrode measured 12 × 1.0 mm.

An analysis indicated the following:

|  | C | Si | Mn | Cr | W | Mo | Ni | Nb | Co | Fe |
|---|---|---|---|---|---|---|---|---|---|---|
| base member | %0.06 | .6 | 0.8 | 17.5 | - | 2.21 | 1.5 | 0.9 | - | Rest |
| flat strip electrode | %0.45 | .3 | 0.4 | 38.5 | 9.9 | 0.1 | - | - | Rest | 2 |
| weld-surfaced wearing layer | %0.38 | .6 | 0.8 | 30.3 | 9.3 | 0.3 | 1.2 | 0.05 | Rest | 14 |

Example 14

A bridge support

The base member was dimensioned 250 × 150 × 1200 mm and was weld-surfaced with a layer measuring 120 × 10 × 1000 mm by means of the submerged are welding technique while using a the base. 20 granular flux material without preheating the base The welding conditions were as follows: Current 4000 amperes; voltage 40 volts; travel speed 10 cm per minute. The cross-section of the flat strip electrode measured 120 × 2.8 mm.

An analysis indicated the following:

|  | C | Si | Mn | Cr | Mo | Fe |
|---|---|---|---|---|---|---|
| base member | %0.25 | 0.5 | 0.8 | - | - | Rest |
| flat strip electrode | %0.40 | 0.3 | 1.0 | 19 | 2.5 | Rest |
| weld-surfaced wearing layer | %0.30 | 1.3 | 0.4 | 14 | 2.0 | Rest |

Example 15

An armored valve cone member

The periphery of the valve member of the valve cone blank was weld-surfaced by means of the submerged arc welding technique using a UM–80 granular flux material without preheating the base.

The welding conditions were as follows: Current 280 amperes; voltage 22 volts; travel speed 19 cm per minute. The cross-section of the flat strip electrode measured 5 × 0.8 mm.

An analysis indicated the following:

|  | C | Si | Mn | Cr | Ni | W | Fe | Co |
|---|---|---|---|---|---|---|---|---|
| Base member % | 0.43 | 2.5 | 1.0 | 18.5 | 9.5 | 1.0 | Rest | |
| Flat strip electrode % | 0.32 | 0.8 | 1.8 | 28.0 | 1.3 | 4.5 | 1.0 | Rest |
| Weld-surfaced wearing layer % | 0.28 | 1.3 | 2.3 | 24.6 | 1.5 | 3.9 | 6.5 | Rest |

There will now be obvious to those skilled in the art many modifications of the above embodiments. Such modifications will come within the scope of the invention if defined by the following claims.

What is claimed is:

1. A process for producing a composite article having a base of tough steel, said article having non-working surfaces and working surfaces, comprising the steps of
    submerged arc weld-surfacing said working surfaces by means of a flat strip electrode having a width in the range of 5 mm to 120 mm and a thickness in the range of 0.3 mm to 3.2 mm;
said flat strip electrode consists of the following composition: 2.0 to 1.7 percent carbon, 0.1 to 1.7 percent silicon, 0.3 to 2.0 percent manganese, 1.0 to 7.0 percent chromium, 0.1 to 12 percent molybdenum, 0.1 to 5.0 percent nickel, 0.1 to 6 percent vanadium, 0.5 to 10 percent cobalt, 0.5 to 0.4 percent copper, 0.2 to 0.3 percent nobium, balance iron with the usual impurities;
    said flat strip electrode used for weld-surfacing said working surfaces travels at a speed in the range of 7–30 cm per minute;
    the current density used in said submerged arc welding technique ranges from 10 to 50 amperes per mm; and
    the voltage used in said submerged arc welding technique ranges from 22 – 40 volts.

2. A process for producing a composite article having a base of tough steel, said article having non-working surfaces and working surfaces, comprising the steps of
    submerged arc weld-surfacing said working surfaces by means of a flat strip electrode having a width in the range of 5 mm to 120 mm and a thickness in the range of 0.3 mm to 3.2 mm;
    said flat strip electrode consists of the following composition: 0.1 – 1.1 percent carbon, 0.2 – 4.0 percent silicon, 0.3–0.8 percent manganese, 12.0–21.0 percent chromium, 0.0–3.0 percent molybdenum, 0.1–2.0 percent nickel, 0.0–0.3 percent vanadium, balance iron with the usual impurities;
    said flat strip electrode used for weld-surfacing said working surfaces travels at a speed in the range of 7–30 cm per minute;
    the current density used in said submerged arc welding technique ranges from 10 to 50 amperes per mm; and
    the voltage used in said submerged arc welding technique ranges from 22 – 40 volts.

3. A process for producing a composite article having a base of tough steel, said article having non-working surfaces and working surfaces, comprising the steps of
    submerged arc weld-surfacing said working surfaces by means of a flat strip electrode having a width in the range of 5 mm to 120 mm and a thickness in the range of 0.3 mm to 3.2 mm;
    said flat strip electrode consists of the following composition: 1.0–1.5 percent carbon, 0.3–0.6 percent silicon, 6.0–18.0 percent manganese, 0.1–2.0 percent chromium, 0.1–2.0 percent molybdenum, 0.1–6.0 percent nickel, balance iron with the usual impurities;
    said flat strip electrode used for weld-surfacing said working surfaces travels at a speed in the range of 7 – 30 cm per minute;
    the current density used in said submerged arc welding technique ranges from 10 to 50 amperes per mm; and
    the voltage used in said submerged arc welding technique ranges from 22 – 40 volts.

4. A process for producing a composite article having a base of tough steel, said article having non-working surfaces and working surfaces, comprising the steps of
    submerged arc weld-surfacing said working surfaces by means of a flat strip electrode having a width in the range of 5 mm to 120 mm and a thickness in the range of 0.3 mm to 3.2 mm;
    said flat strip electrode consists of the following composition: 0.0–1.2 percent carbon, 0.5–1.0 percent silicon, 0.1–1.0 percent manganese, 25.0–37.0 percent chromium, 0.1–7.0 percent nickel, 2.0–25.0 percent tungsten, 0.0 – 5 percent iron, balance cobalt with the usual impurities;
    said flat strip electrode used for weld-surfacing said working surfaces travels at a speed in the range of 7 – 30 cm per minute;
    the current density used in said submerged arc welding technique ranges from 10 to 50 amperes per mm, and
    the voltage used in said submerged arc welding technique ranges from 22 – 40 volts.

* * * * *